(12) United States Patent
Han

(10) Patent No.: US 6,201,615 B1
(45) Date of Patent: Mar. 13, 2001

(54) METHOD FOR DETECTING DOCUMENT SIZE

(75) Inventor: Ji-hoon Han, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/110,187

(22) Filed: Jul. 6, 1998

(30) Foreign Application Priority Data

Jul. 4, 1997 (KR) ................................................. 97-30931

(51) Int. Cl.[7] ..................................................... G01N 21/86
(52) U.S. Cl. ............................................. 358/449; 358/528
(58) Field of Search .................................... 358/448–449, 358/1.2, 528, 451, 1.9

(56) References Cited

U.S. PATENT DOCUMENTS

| | | | |
|---|---|---|---|
| 4,814,833 | 3/1989 | Matsushita et al. | 355/75 |
| 5,198,853 * | 3/1993 | Ichihara et al. | 355/244 |
| 5,325,213 * | 6/1994 | Takahashi et al. | 358/474 |
| 5,895,928 * | 4/1999 | Kerschner | 250/559.37 |
| 6,008,501 * | 12/1999 | Pan | 250/559.4 |

* cited by examiner

Primary Examiner—Thomas D. Lee
Assistant Examiner—Stephen Brinich
(74) Attorney, Agent, or Firm—Robert E. Bushnell, Esq.

(57) ABSTRACT

Disclosed is a method for detecting a document size when the width of a document to be scanned is smaller than an effective scan width of a scanner module. One block of a document support plate is scanned before a document to be scanned is fed and a data value of the scanned block is stored as a reference color data value. After pre-scanning a first block of the document, dividing the document block, widthwise, into a predetermined number of slice, determining whether the reference color data value and a color data value of an Nth slice of the document block are equal, where N is initially set to one, increasing N by one, when it is determined that the reference color data value and the color data value of the Nth slice of the document block are not equal and repeating the determining step, setting a value of the document size to be equal to N−1, when it is determined that the reference color data value and the color data value of the Nth slice of the document block are equal.

7 Claims, 3 Drawing Sheets

METHOD FOR DETECTING DOCUMENT SIZE

CLAIM OF PRIORITY

This application makes reference to, incorporates the same herein, and claims all benefits accruing under 35 U.S.C §119 from an application entitled Method For Detecting Document Size earlier filed in the Korean Industrial Property Office on Jul. 4, 1997, and there duly assigned Serial No. 97-30931 by that Office.

BACKGROUND OF THE INVENTION

1. Field of the Invention

The present invention relates to a method for detecting a document size and, more particularly to a method for detecting a document size when the width of a document to be scanned is smaller than an effective scan width of a scanner module.

2. Description of the Related Art

Nowadays, office automation facilities such as a printer, scanner and a facsimile have been widely used. In order to extend their own functions, each of the office automation facilities is developed to have high performance and thereby costly products are manufactured. On the other hand, to reduce user's economic burden, the office automation facilities which are separately used are developed integrally. Such a device is conventionally indicated as a multifunctional machine.

A known multifunctional machine integrates a print head using an ink jet printing method and a scanner module of shuttle type. The print head and the scanner module are established in one set, and print on a recordable medium or scan a document by performing reciprocating motion in a same path. At this time, the traveling direction of the print head and scanner module is transverse to the direction to which the recordable medium or the document is transported. The print head and the scanner module are moved simultaneously by one motor.

As is well known, a background of the document scanned by the scanner module is supported by a supporting plate. Conventionally, since a white roller is used as the supporting plate in the multifunctional machine having an array type scanner module, in the case of parts other than the scanned range, it is recognized as having no data by data-processing suitable to a white color by scanning the white roller. In the shuttle type, however, since the print head and the scanner module are established in parallel in the direction to which they perform the reciprocating movement, it is possible for the supporting plate to be contaminated by ink sprayed from the print head. Accordingly, the color of the supporting plate is processed as black. When scanning the document having a width smaller than the effective scan range of the scanner module, parts other than the document are data-processed suitably as black data.

Accordingly, since the black color means data in a black and white scanner, the data amount to be processed increases. As a result, the scanning time increases. Similarly in a color scanner, since the black part is treated as a part having a certain information, the scanning time also increases.

In addition, useless data which are processed in the parts other than the document consume much time when transmitting and receiving fax data, and exhaust much ink or toner of in the device which receives the data.

SUMMARY OF THE INVENTION

Therefore, it is an object of the present invention to provide a method for detecting a document size capable of efficiently processing a background other than the document when scanning the document having a width smaller than an effective scan width of a scanner module.

According to one aspect of the present invention, before feeding a document to be scanned, one block of a plate is scanned and it is stored as a reference color data value. After pre-scanning a first block of the document, it is successively compared and judged whether a color data value corresponding to a first slice is the same as the reference color data value. In the case that the color data value of an optional slice is the same as the reference color data value, the size corresponding to the position of a slice just before the optional slice is detected as the size of the document. This preferred embodiment can be applied when the document is fed and aligned with the left side end of the plate.

According to another aspect of the present invention, before a document to be scanned is fed, a block of a plate is scanned and it is stored as a reference color data value. After pre-scanning a first block of the document, it is successively compared and determined whether color data values corresponding to each slice including the first slice are not same as the reference color data value. When the color data value of the first slice is not the same as the reference color data value, the position of the first slice is detected as a first position. Moreover, it is successively compared and judged whether color data values corresponding to each slice excluding the first slice are the same as the reference color data value. When the color data value of a second slice is the same as the reference color data value, the position of the slice just before the second slice is detected as a second position. Afterwards, the size corresponding to the difference between the second position and first position is detected as the document size. By repeatedly performing the steps after the step of pre-scanning the document, the document size can be detected more accurately. This preferred embodiment can be applied when the document is fed and not aligned with the left side end of the plate. Preferably, the reference color is a black, and the color of the document is a white.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The objects, characteristics and advantages of the above-described invention will be more clearly understood through the preferable embodiments referring to the attached drawings.

As the terms mentioned later are determined based upon the function of the present invention and they can be changed according to the technician's intention or a usual practice, the terms should be determined considering the overall contents of the specification of the present invention.

Figure 1:
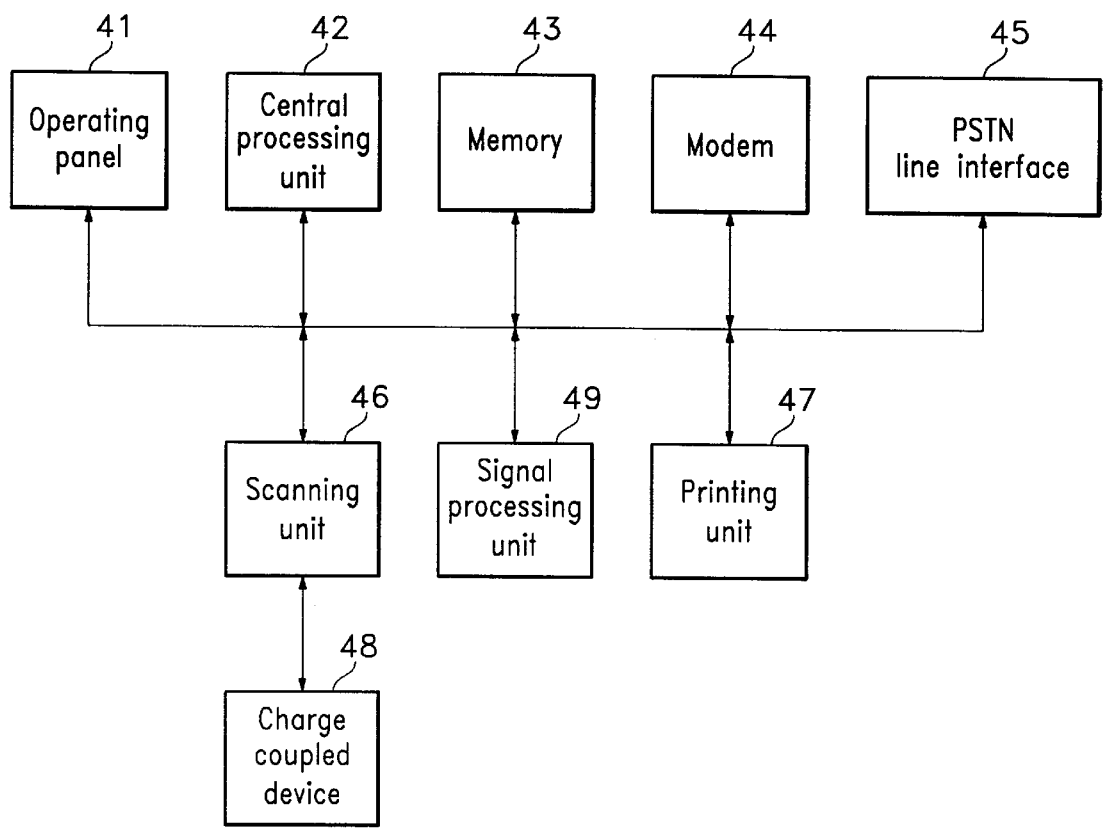
FIG. 1 is a block diagram illustrating the structure of a multifunctional machine to which the present invention is applied.

FIG. 1 is a block diagram illustration the structure of a multifunctional machine to which the present invention is applied. As shown in the drawing, the multifunctional machine includes a central processing unit 42 which controls a print head (not shown) and a scanner module (not shown) according to a certain program and calculates the size of a document (not shown) through comparing data values obtained by scanning the document; a memory 43 which stores program data, protocol data and figure data under the control of the central processing unit 42; an operating panel 41 which has a plurality of keys (not shown) for generating key data, inputs the generated key data to the central processing unit 42 and has a display unit (not shown) for displaying display data of the central processing unit 42; a charged coupled device (CCD) 48 which reads image data from the document, photoelectrically converts the image data and then outputs the photoelectrically converted image data; a scanning unit 46 which provides the photoelectrically converted image data outputted from the CCD 48 to the central processing unit 42; a modem 44 which modulates output data of the central processing unit 42 to an analog data and demodulates received modulated analog data and then outputs the demodulated data, under the control of the central processing unit 42; a signal processing unit 49 which encodes and decodes the image data output from the scanning unit 46 and the demodulated image data output from the modem 44; a PSTN (Public Switched Telephone Network) line interface 45 which forms a communication loop of a telephone line after being operated according to the control of the central processing unit 42 and interfaces the signal of the modem 44 and the signal of the telephone line; and a printing unit 47 which prints the received data according to a control signal of the central processing unit 42.

Figure 2:
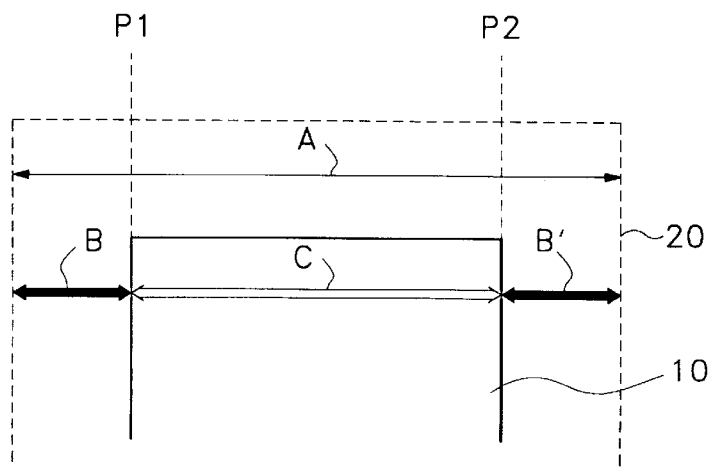
FIG. 2 is a conceptual view illustrating the state that a document having a width smaller than an effective scan width is fed.

FIG. 2 is a conceptual view illustrating the state that the document having a width smaller than the effective scan width. As shown in the drawing, a supporting plate 20, having a black color, has a width of A, and the document 10 which is fed has a width of C, which is smaller than A. When the document 10 is fed, the left edge (illustrated orientation) of the document 10 would normally be conventionally aligned with the left edge end of the supporting plate 20. However, in some cases, the left edge of the document 10 and the supporting plate 20 may not, or can not, be aligned each other. For example, as shown in FIG. 2, the left edge of document 10 may be spaced apart from the left edge of supporting plate 20 by a distance B and the right edge of document 10 may be spaced apart from the right edge of supporting plate 20 by a distance B'.

The cases of which the left edge of the document 10 is, or is not, aligned with the left edge of the supporting plate 20 are explained, as follows, in accordance with the principles of the present invention. Moreover, for easy explanation, the reference color of the supporting plate 20 is defined as black, and the document color is defined as white. However, in actual circumstances, the reference color data value varies according to the color of the supporting plate 20, and a document color data value varies according to the color of the document 10.

The scanning method of shuttle type scanner in a multi-function machine is explained as follows. When, for example, a document of A4 size having 2481×3507 dots at 300 DPI (dots-per-inch) is scanned using the charged coupled device 48, the A4 size document is divided into 27 shuttle blocks in the document transporting direction (lengthwise). Each of the shuttle blocks is divided into 2481 slices, i.e., 1st to 2481st slices in the direction transverse (widthwise) to the document transporting direction. In other words, in order to scan the entire document, all the shuttle blocks can continuously be scanned in the document transporting direction, and 2481 slices of each block can continuously be scanned in the direction perpendicular to the document transporting direction.

Figure 3:
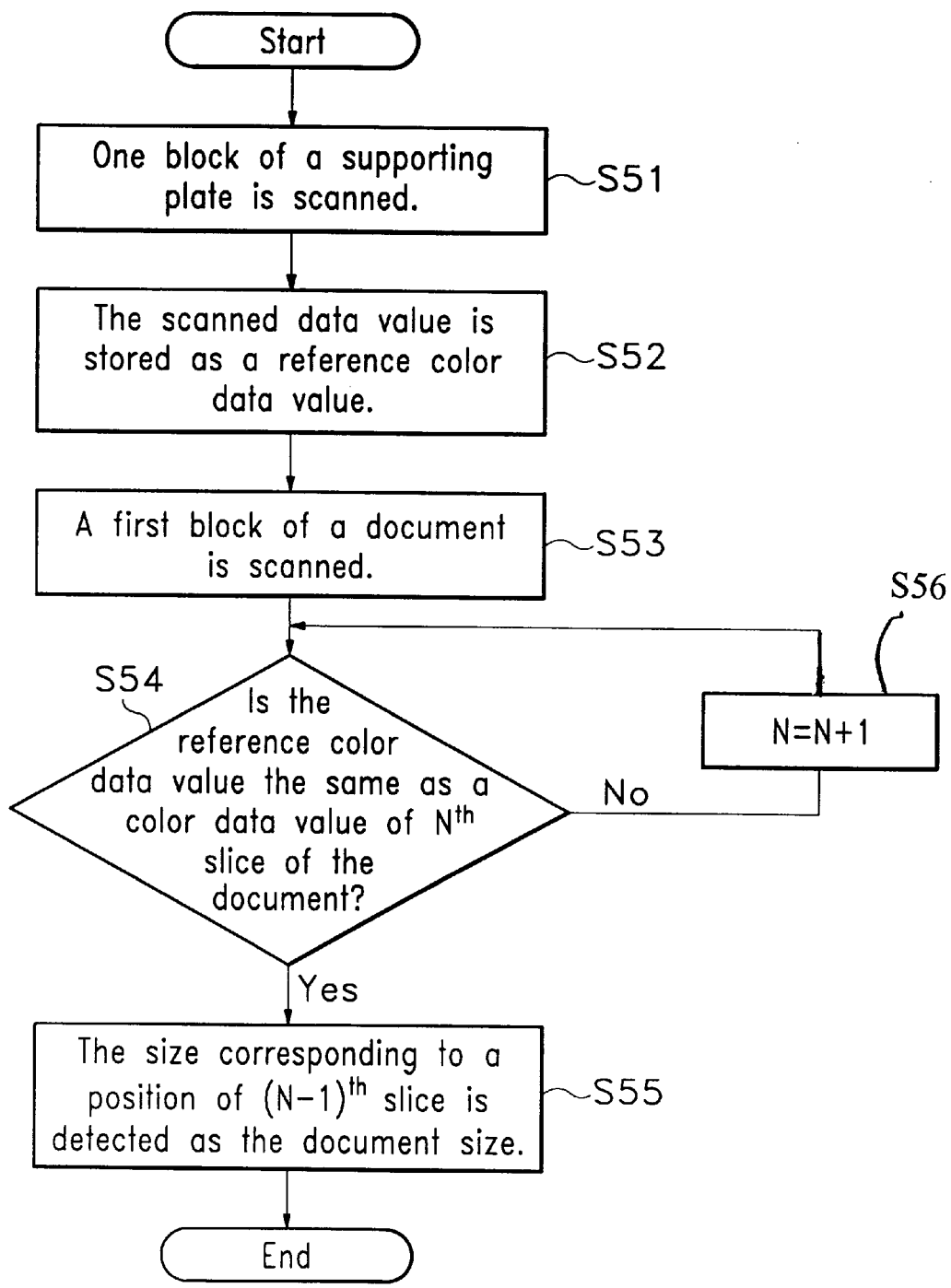
FIG. 3 is a flowchart illustrating a method for detecting a document size according to one aspect of the present invention.

FIG. 3 is a flowchart illustrating a method for detecting the document size according to one embodiment of the present invention. First, when a signal for starting the scanning operation is input from operating panel 41, one block of the supporting plate 20 is scanned before the document 10 is fed (step 51). In this embodiment, the color of the supporting plate 20 is black. The scanned data value is stored in the memory 43 of FIG. 1 as the reference color data value (step 52). That is, as the reference color, the data value corresponding to the black color is stored in the memory 43. When the document 10 is fed, and is aligned with the left edge of the supporting plate 20, the first block of the document 10 is pre-scanned (step 53).

Afterwards, an Nth slice, where N is initially set to one (1), of the first block of the scanned document is compared to the reference color data value stored in the memory 43 to determine whether the color data value corresponding to the Nth slice of the first block of the scanned document is the same as the reference color data value stored in the memory 43 (step 54).

If it is determined that color data value of the Nth slice of the first block of the scanned document is not the same as the reference color value, then the value N is increased by one (step 56) and step 54 is repeated to determine whether the color data value corresponding to the next (N+1)th slice of the first block of the scanned document is the same as the reference color data value stored in the memory 43.

When it is determined that the color data value of one of the 2481 slices, e.g. slice number 1750, of the first block of the scanned document is the same as the reference color data value, a size corresponding to a position of a slice just before the 1750th slice, i.e., the 1749th slice (N−1), is detected as the document size (step 55), which in accordance with the example given, corresponds to a document of A5 size, when scanning at 300 dots-per-inch. In other words, when the color data value of the Nth slice of the first block of the scanned document is the same as the reference color data value, then this means that the scanner was over supporting plate 20 when this slice was scanned during the document scanning operation. Accordingly, the size of the document that was scanned corresponds to the slice just before, i.e. the (N−1)th slice, the slice, i.e. the Nth slice, having a color data value equal to the reference color data value.

Figure 4:
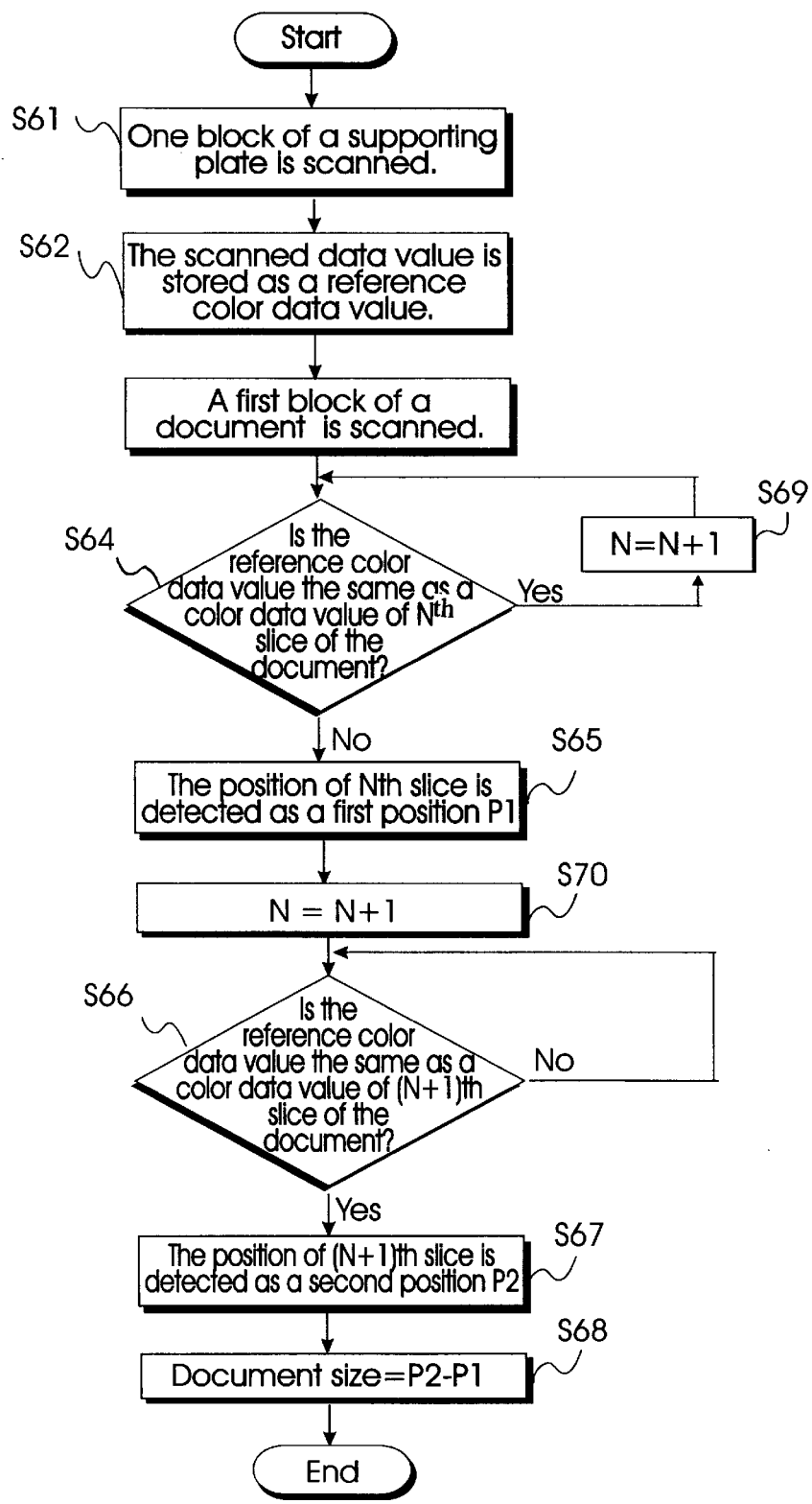
FIG. 4 is a flowchart illustrating a method for detecting a document size according to another aspect of the present invention.

Referring to FIG. 4, there is shown a flowchart illustrating a method for detecting the document size according to another embodiment of the present invention. First, when a signal for starting the scanning operation is input from operating panel 41, one block of the supporting plate 20 is scanned before the document 10 is fed (step 61). In this embodiment, the color of the supporting plate 20 is black. The scanned data value is stored in the memory 43 of FIG. 1 as the reference color data value (step 62). That is, as the reference color, the data value corresponding to the black color is stored in the memory 43.

When the document 10 is fed, a first block of the document 10 is pre-scanned (step 63). At this time, assume that left edge of the document 10 is not being aligned with the left edge of the supporting plate 20. Afterwards, an Nth slice, where N is initially set to one (1), of the first block of the scanned document is compared to the reference color data value stored in the memory 43 to determine whether the color data value corresponding to the Nth slice of the first block of the scanned document is the same as the reference color data value stored in the memory 43 (step 64). If it is determined that color data value of the Nth slice of the first block of the scanned document is the same as the reference color value, then the value N is increased by one (step 69) and step 64 is repeated to determine whether the color data value corresponding to the next (N+1)th slice of the first block of the scanned document is the same as the reference color data value stored in the memory 43.

When it is determined that the color data value of the currently compared Nth slice is not the same as the reference color data value, the position of the Nth slice is detected as a first position (step 65), P1 in FIG. 2. Accordingly, the position P1 of the currently compared Nth slice is located at the left edge of document 10.

Then in the next step (step 70) the value of N is increased by one so that the color data value of the next slice can be compared to the reference color data value (step 66). Steps 70 and 66 are repeated until it is determined that the color data value of the currently compared Nth slice is the same as the reference color data value.

When it is determined in step 66 that the color data value of the currently compared Nth slice is the same as the reference color data value, then the currently compared Nth slice is detected as the second position (step 67), P2, in FIG. 2. Accordingly, the slice at position P2 actually corresponds to a slice of the supporting plate 20 adjacent to the slice located at the right edge of document 10. Afterwards, the size corresponding to the difference between the second position P2 and the first position P1 is detected as the document size (step 68). For example, the value of P1 may be 12 and the value of P2 may be 1761, thus the difference between P2 and P1 is equal to 1749 which corresponds to a document of A5 size, when scanning at 300 dots-per-inch.

In the above description of FIG. 4 is was assumed that the left edge of the document 10 was not being aligned with the left edge of the supporting plate 20, however, if we assume that the left As edge of the document 10 is aligned with the left edge of the supporting plate 20, then for an A5 size document, the value of P1 would be equal to 1 and the value of P2 would be equal to 1750.

According to the above methods, since the size of the document which is fed can be detected, it is possible to prevent the processing of data outside the boundaries of the document or to control the movement of the scanner module.

When data processing is not performed regarding the parts other than the document, the data amount decreases and data processing speed increases accordingly. For example, in the case of transmitting the scanned data via fax, the methods have a benefit to rapidly transmit the data.

Moreover, after defining the first position as the left edge end and the second position as the right edge end based on the detected first and second positions and then controlling the scanner module to reciprocate between the two positions, the scanning time can be reduced.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method of detecting a document size of a document scanned by a multifunctional machine including a scanner module and a printer unit that move across said document widthwise as said document is fed lengthwise through a paper path, the method comprising the steps of:

scanning a block of a document support plate and storing a scanned data value of the scanned block as a reference color data value in a memory;

scanning a first block of said document and generating a document block;

dividing said document block, widthwise, into a predetermined number of slices;

determining whether said reference color data value and a color data value of an Nth slice of said document block are equal, where N is initially set to one;

increasing N by one, when it is determined that said reference color data value and said color data value of said Nth slice of said document block are not equal and repeating said determining step;

setting a value of said document size to be equal to N−1, when it is determined that said reference color data value and said color data value of said Nth slice of said document block are equal.

2. The method of claim 1, wherein said document support plate is black and said document has a white background.

3. The method of claim 1, further comprising a step of feeding said document with an edge, where N is equal to 1, of said document being aligned with a corresponding edge of said document support plate.

4. A method of detecting a document size of a document scanned by a multifunctional machine including a scanner module and a printer unit that move across said document widthwise as said document is fed lengthwise through a paper path, the method comprising the steps of:

scanning a block of a document support plate and storing a scanned data value of the scanned block as a reference color data value in a memory;

scanning a first block of said document and generating a document block;

dividing said document block, widthwise, into a predetermined number of slices;

determining whether said reference color data value and a color data value of an Nth slice of said document block are equal, where the value of N is initially set to one;

setting a first position value equal to the value of N, when it is determined that said reference color data value and said color data value of said Nth slice of said document block are not equal;

increasing the value of N by one;

determining whether said reference color data value is equal the color data value of a slice corresponding to the current value of N;

returning to said step of increasing the value of N by one, when it is determined that said reference color data value is not equal to said color data value of said slice corresponding to the current value of N;

setting a second position value equal to the current value of N, when it is determined that said reference color data value is equal to said color data value of said slice corresponding to the current value of N; and setting a value of said document size to be equal to a difference between said second position value and said first position value.

5. The method of claim 4, further comprising a step of increasing N by one, when said step of determining whether said reference color data value and a color data value of an Nth slice of said document block are equal determines that said reference color data value and said color data value of said Nth slice of said document block are equal and then repeating said step of determining whether said reference color data value and a color data value of the Nth slice of said document block are equal.

6. The method of claim 4, wherein said document support plate is black and said document has a white background.

7. A method of detecting a document size of a document scanned by a multifunctional machine including a scanner module and a printer unit that move across said document widthwise as said document is fed lengthwise through a paper path, the method comprising the steps of:

scanning a block of a document support plate and storing a scanned data value of the scanned block as a reference color data value in a memory;

scanning a first block of said document and generating a document block;

dividing said document block, widthwise, into a predetermined number of slices;

determining whether said reference color data value and a color data value of an Nth slice of said document block are equal, where the value of N is initially set to one;

increasing the value of N by one, when it is determined said reference color data value and a color data value of an Nth slice of said document block are equal, and returning to said determining step;

setting a first position value equal to the value of N, when it is determined that said reference color data value and said color data value of said Nth slice of said document block are not equal;

increasing the value of N by one;

determining whether said reference color data value is equal the color data value of a slice corresponding to the current value of N;

returning to said step of increasing the value of N by one, when it is determined that said reference color data value is not equal to said color data value of said slice corresponding to the current value of N;

setting a second position value equal to the current value of N, when it is determined that said reference color data value is equal to said color data value of said slice corresponding to the current value of N; and setting a value of said document size to be equal to a difference between said second position value and said first position value.

* * * * *